Patented June 9, 1925.

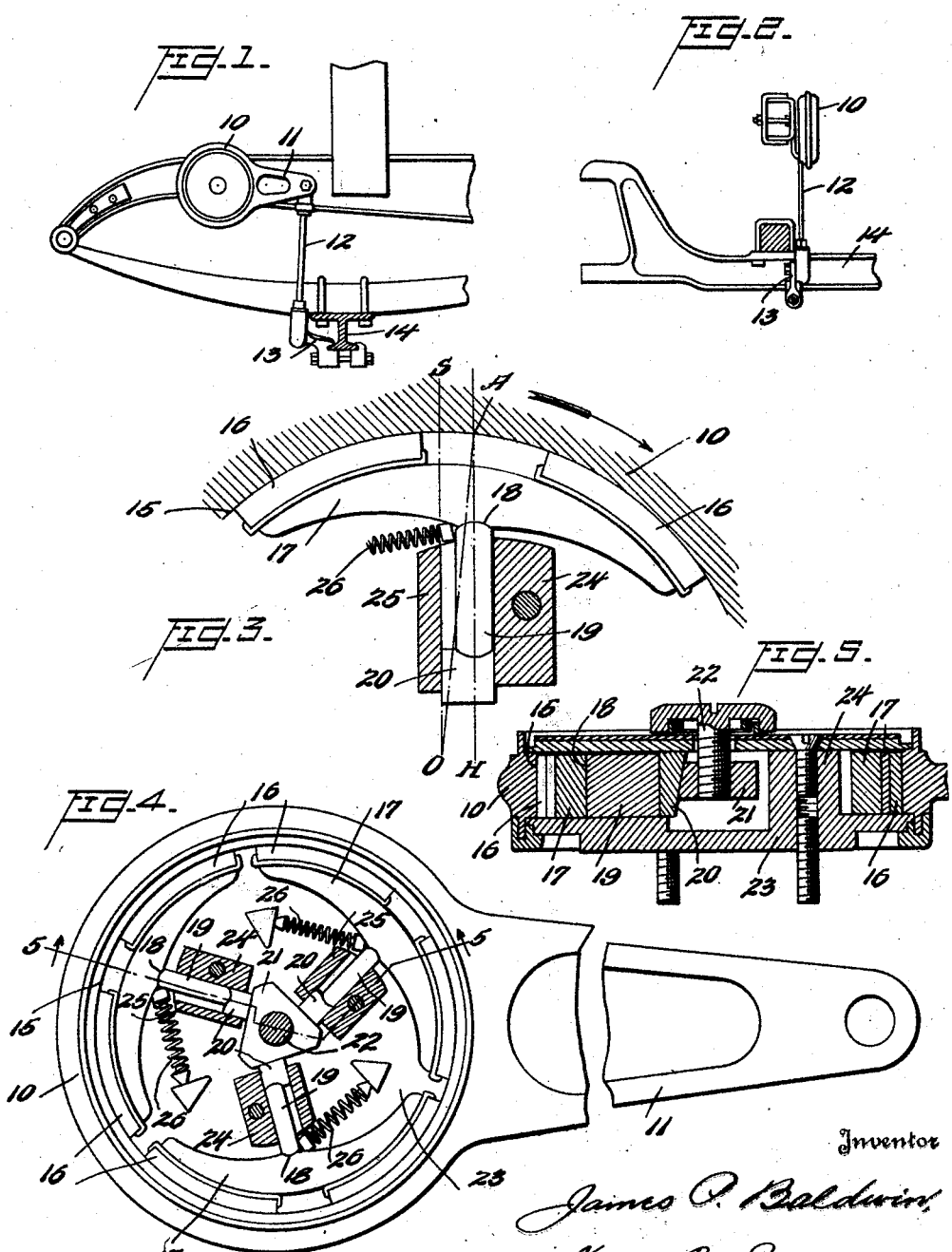

1,540,746

UNITED STATES PATENT OFFICE.

JAMES PIERCE BALDWIN, OF LOS ANGELES, CALIFORNIA.

SHOCK ABSORBER.

Application filed November 11, 1924. Serial No. 749,277.

*To all whom it may concern:*

Be it known that I, JAMES PIERCE BALDWIN, a citizen of the United States, and a resident of Los Angeles, in the county of Los Angeles, State of California, have invented certain new and useful Improvements in Shock Absorbers, of which the following is a specification.

This invention relates to running friction clutches adapted for use as spring dampers on automobiles and relates more particularly to that type of damper which uses moving struts for actuating the friction mechanism. It is distinguished from such running clutches as are designed for substantially unyielding engagement, and in order to more clearly define its character, I have termed it a sliding clutch. It is entirely foreign to stationary clutches which are clutches that function equally in both directions of movement.

Heretofore, when running clutches, that is, clutches functioning in but one direction of movement, and substantially unyielding in this one direction, have been used as spring dampers, it has been necessary to provide delicate adjustments or to fit such clutches with resilient members, so that the clutch will offer the desired yielding resistance, and an object of this invention is to provide a running friction clutch that will offer the desired yielding resistance to movement of the spring, without the use of such resilient members and without delicate adjustments. This application constitutes a continuation in part of my application Serial No. 246,408, filed June 22, 1918.

In the accompanying drawings one form of the invention is illustrated by way of example, but it will be understood that the invention is susceptible of considerable modification without departing from its spirit and scope.

In the drawings:

Figures 1 and 2 illustrate together one method of attaching my improved clutch to an automobile spring so as to dampen its oscillations, the form of clutch disclosed having an oscillatable annular ring secured to one member and a stationary support for the struts and brake shoes to the other member.

Figure 3 is a partial section on a large scale through the clutch, showing one of the brake shoes, and the moving strut.

Figure 4 is a section through the entire clutch.

Figure 5 is a vertical section through the clutch on the lines 5—5 of Figure 4.

The oscillatable ring is indicated at 10, this ring having an arm 11 connected by a link 12 with a bracket 13 clamped to the cross-piece or axle 14 of the automobile. The ring is provided with a cylindrical internal friction face 15 against which bear the spaced rub faces or friction pads 16 of three brake shoes 17. These brake shoes are non-resilient and are provided with slight recesses 18 within which the cylindrical outer ends of struts 19 are rotatably received. The inner ends of these struts are likewise provided with cylindrical faces which rest in correspondingly shaped recesses in bearing blocks 20. Bearing blocks 20 in turn rest against the triangular base or supporting member 21 which may be adjusted inwardly and outwardly by the adjusting screw 22, as pointed out in my copending application, to radially adjust the bearing blocks and struts. The stationary base plate 23 is provided with pairs of upwardly extending lugs 24 and 25 spaced apart, the lugs of each pair forming together a retaining groove for a strut 19. Springs 26 bear against the brake shoes and struts at the joints between these members and tend to thrust the brake shoes into contact with the oscillatable ring 10.

As the ring 10 moves in the direction of the arrow (Figure 3), the brake shoe will follow and be thrust by the struts toward its friction surface to retard the movement of the ring. Movement of the ring in the opposite direction causes the brake shoe to release the ring.

The angle HAO indicates the angle of thrust when the strut 19 is in fully engaged position. It will be seen that it is thus possible to predetermine the angle of thrust at the position where the strut is exerting its maximum pressure, and with a style of strut which is not new in the art. This result is accomplished by arranging the guide walls or ways 24 and 25 at one side of and parallel to the radial line OS and by thus providing a fixed stop at 24 for preventing the strut from assuming a position in which the angle of thrust would approximate the angle of zero, which would occur should the strut become radial to the annulus or ring. In order to insure functioning of the strut at all times, that is, to insure that when the ring 10 moves in the direction of the arrow the brake shoes will move from disengaged to engaged position, springs 26 are provided. These may be dispensed with if there is constant engagement between the brake shoes and ring 10 and a sufficiently high coefficient of friction to secure movement of the brake shoe into engaging position. While the shoe is approaching fully engaged position, the angle of thrust is becoming smaller, but can never become less than the angle HAO because of the stop 24.

The style of clutch, as well as the design of its component parts, the shoe friction member and strut may be varied largely without departing from the spirit of the invention.

Having thus described my invention what I claim as new and desire to secure by U. S. Letters Patent is:

1. In a shock absorber, in combination, relatively movable but non-separable friction and supporting members, and a brake shoe and movable strut interposed between said members, one end of the strut being carried by the support and the other end engaging the brake shoe, the arrangement being such that the strut tends to assume such position as to transmit thrust in a direction normal to the friction member as it moves in one direction, and means for preventing said strut from assuming such position, for the purpose set forth.

2. In a shock absorber, in combination, relatively movable but non-separable friction and supporting members, and a brake shoe and movable strut interposed between said members, one end of the strut being carried by the support and the other end engaging the brake shoe, the arrangement being such that the strut tends to assume such position as to transmit thrust in a direction normal to the friction member as it moves in one direction, and a stop or abutment in the path of the moving strut to limit its movement so as to prevent it from transmitting thrust in a direction normal to the friction member.

3. In a shock absorber, in combination, an annulus provided with an internal friction face, a support disposed centrally thereof, a brake shoe adapted to engage the friction face, a movable strut for conveying the thrust of the shoe to said support, said strut being moved toward a position to convey the thrust radially to the support as the shoe increases its resistance to the movement of the annulus, and means to prevent the strut assuming a position to convey radial thrust, for the purpose set forth.

4. In a shock absorber, in combination, an annulus provided with an internal friction face, a support disposed centrally thereof, a brake shoe adapted to engage the friction face, a movable strut for conveying the thrust of the shoe to said support, said strut being moved toward a position to convey the thrust radially to the support as the shoe increases its resistance to the movement of the annulus, and a stop intermediate the annulus and support for preventing the strut from assuming a position to convey radial thrust for the purpose specified.

In testimony whereof I hereunto affix my signature.

JAMES PIERCE BALDWIN.